United States Patent
Hirabayashi et al.

(10) Patent No.: US 7,817,376 B2
(45) Date of Patent: Oct. 19, 2010

(54) THIN-FILM MAGNETIC HEAD HAVING MAGNETIC LAYER WITH NON-MAGNETIC PORTION

(75) Inventors: Hiraku Hirabayashi, Tokyo (JP); Kenkichi Anagawa, Tokyo (JP)

(73) Assignee: TDK Corporation, Tokyo (JP)

(*) Notice: Subject to any disclaimer, the term of this patent is extended or adjusted under 35 U.S.C. 154(b) by 706 days.

(21) Appl. No.: 11/738,686

(22) Filed: Apr. 23, 2007

(65) Prior Publication Data

US 2007/0253104 A1    Nov. 1, 2007

(30) Foreign Application Priority Data

Apr. 28, 2006    (JP) .............................. 2006-125282

(51) Int. Cl.
G11B 5/127 (2006.01)
G11B 5/147 (2006.01)
(52) U.S. Cl. .............................. 360/125.45; 360/125.5
(58) Field of Classification Search ............ 360/125.43, 360/125.44, 125, 45, 125.5, 125.54
See application file for complete search history.

(56) References Cited

U.S. PATENT DOCUMENTS 6,504,686 B1    1/2003    Sasaki

2002/0024776 A1 *   2/2002   Sasaki et al. ................ 360/317
2003/0231425 A1 *  12/2003   Macken et al. .............. 360/126
2005/0264934 A1    12/2005   Oike et al.

FOREIGN PATENT DOCUMENTS

JP    11-007609    1/1999
JP    2000-315302   11/2000

* cited by examiner

*Primary Examiner*—Joseph H Feild
*Assistant Examiner*—Gustavo Polo
(74) *Attorney, Agent, or Firm*—Oblon, Spivak, McClelland, Maier & Neustadt, L.L.P.

(57) ABSTRACT

Provided is a thin-film magnetic head capable of suppressing ATE while ensuring sufficient controllability of the magnetic pole width and sufficient write field intensity. The head includes an electromagnetic coil element comprising: upper and lower magnetic layers; a write gap layer; and a write coil layer, the lower magnetic layer comprising: a lower yoke layer, a non-magnetic portion formed on an end portion on the ABS side of the lower yoke layer and extending to a head end surface on the ABS side; and a lower magnetic pole layer, an upper surface of the lower magnetic pole layer being in contact with the write gap layer, and an end surface in the head end surface of the lower magnetic pole layer having a shape whose width along a track width direction is defined by a predetermined magnetic pole width.

24 Claims, 13 Drawing Sheets

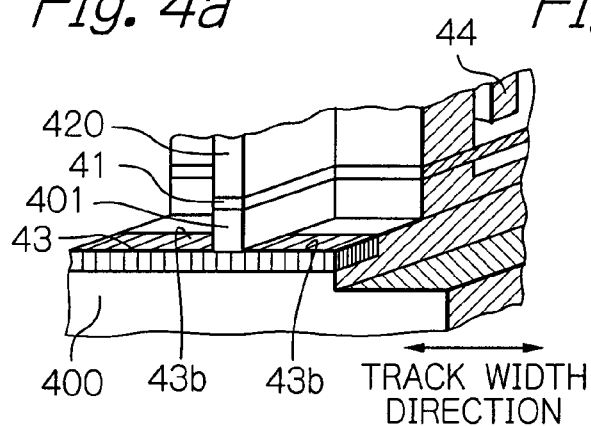
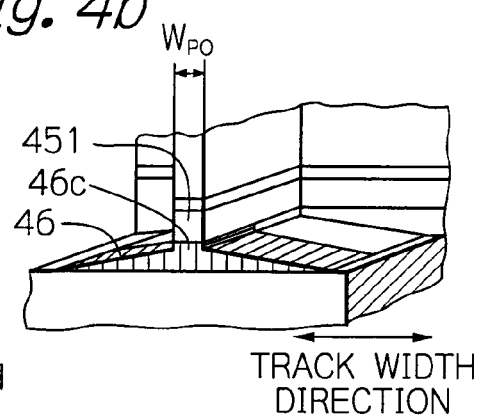
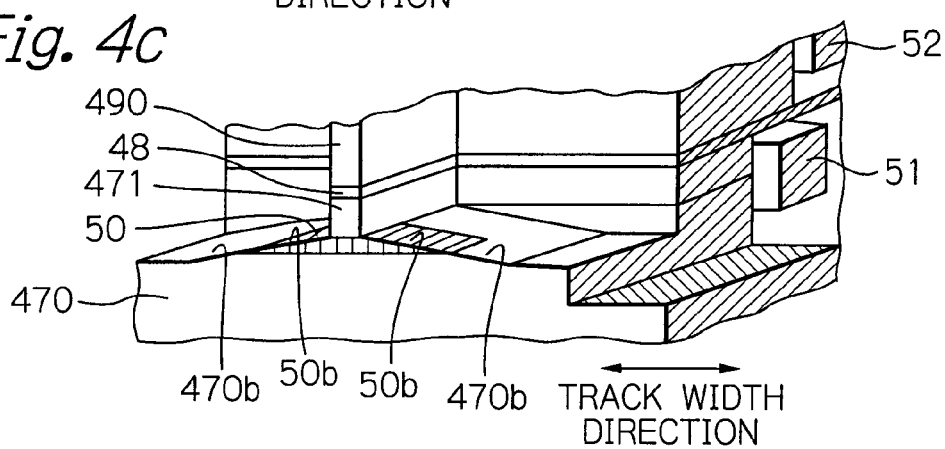
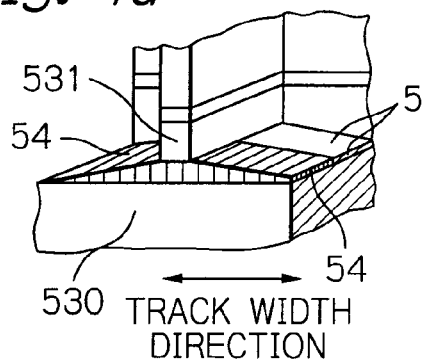
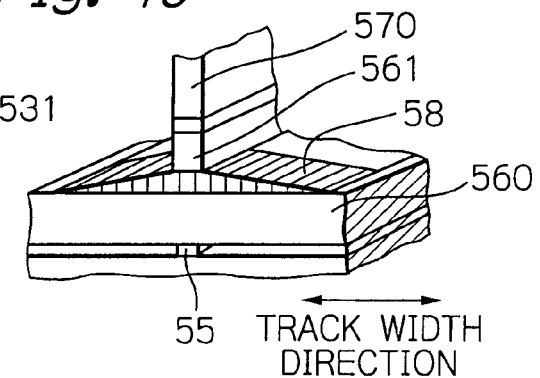
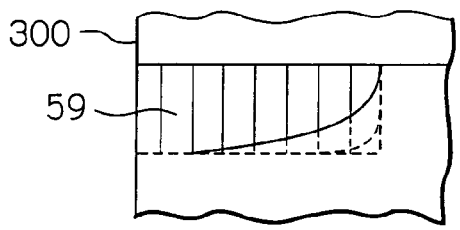
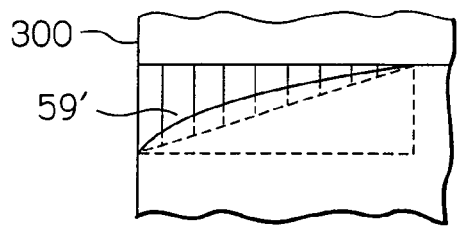

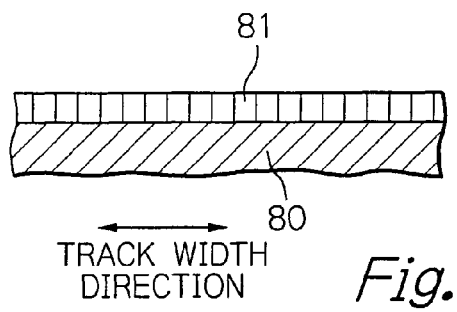
Fig. 6a1
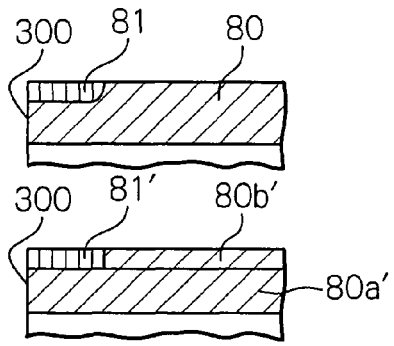
Fig. 6a2
Fig. 6a3
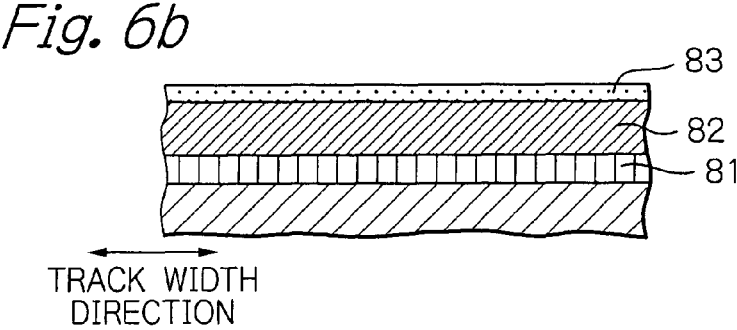
Fig. 6b
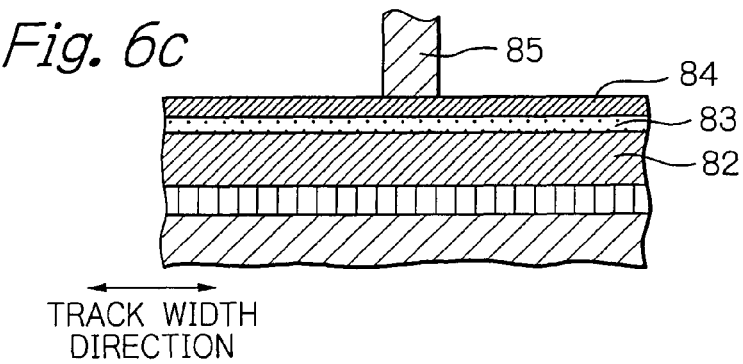
Fig. 6c
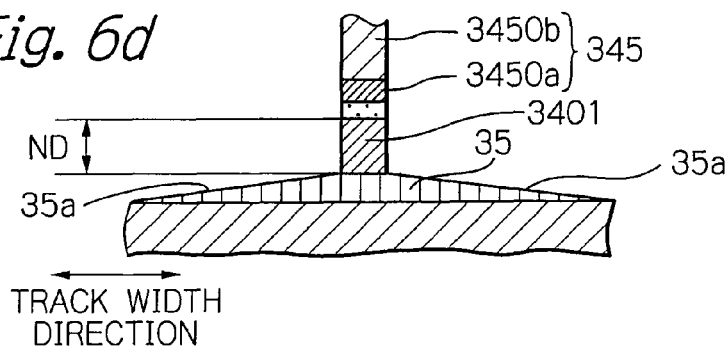
Fig. 6d

THIN-FILM MAGNETIC HEAD HAVING MAGNETIC LAYER WITH NON-MAGNETIC PORTION

PRIORITY CLAIM

This application claims priority from Japanese patent application No. 2006-125282, filed on Apr. 28, 2006, which is incorporated herein by reference.

BACKGROUND OF THE INVENTION

1. Field of the Invention

The present invention relates to a thin-film magnetic head for magnetic recording including an electromagnetic coil element having magnetic layers, a head gimbal assembly (HGA) including the thin-film magnetic head, and a magnetic disk drive apparatus including the HGA.

2. Description of the Related Art

With the increasing demand for small, and yet high-capacity magnetic disk drive apparatus in recent years, further improvements in recording density have become essential. Important factors for increasing recording density include a reduction in the width along the track-width direction of the magnetic pole of the electromagnetic coil element in thin-film magnetic heads and an improvement of the intensity of the write field generated from the magnetic pole.

The electromagnetic coil element of a typical thin-film magnetic head has a lower magnetic layer (a magnetic layer on the leading side) and an upper magnetic layer (a magnetic layer on the trailing side) that sandwich a gap layer. The lower magnetic layer includes a rectangular projected portion having the same width along the track-width direction as that of the magnetic pole of the upper magnetic layer and a considerably wide portion below the rectangular projected portion, thereby efficiently guiding a magnetic flux excited by a write current flowing through the coil layer of the electromagnetic coil element to the gap layer and trying to cope with narrower track widths.

Structures of the lower magnetic layer are disclosed in U.S. Pat. No. 6,504,686 and Japanese Patent Publication 2000-315302A in which a non-magnetic layer is provided in a considerably wide portion of the lower magnetic layer. In these structures, the lower magnetic layer also acts as an upper shield layer for a magnetoresistive (MR) effect element for reading data provided adjacent to the electromagnetic coil element. In U.S. Pat. No. 6,504,686 and Japanese Patent Publication 2000-315302A, the non-magnetic layer formed in the structures alleviates adverse influences of the magnetic field from the electromagnetic coil element on the output characteristics of the MR effect element.

However, there has been a problem that the influence of a leakage magnetic field from the magnetic pole increases as the width of the magnetic pole along the track-width direction is reduced, and, as a result, increased is the probability of an unwanted write or erasure in adjacent tracks, namely Adjacent Track Erase (ATE), on a magnetic disk as a magnetic recording medium.

Especially in tracks near the outer edge of a magnetic disk and tracks near the center, the skew angle, i.e. an angle of the head with respect to the tracks increases and accordingly the magnetic pole on the leading side becomes closer to the adjacent tracks. As a result, increased is the possibility that a leakage magnetic field from the magnetic pole on the leading side causes ATE. To prevent this, the saturation magnetic flux density of the magnetic pole on the leading side may be reduced to reduce the leakage magnetic field. However, this limitation inevitably reduces the intensity of the write field itself.

Another solution to suppress ATE may be to increase the neck-depth of the lower magnetic layer. The term neck-depth herein refers to the length of a rectangular projected portion of a lower magnetic layer along the stacking direction. The neck-depth in practice is an amount that is adjusted during formation of the rectangular projected portion by ion etching using a magnetic pole portion of an upper magnetic layer as a mask. However, the neck depth cannot be increased above a certain value simply by increasing the amount of etching with the current state of the art, because this increase has disadvantageous effects such as shortening of the magnetic pole portion of the upper magnetic layer, increase in unevenness of a magnetic pole width, and impairment of controllability of the magnetic pole width.

The lower magnetic layer including a non-magnetic portion disclosed in U.S. Pat. No. 6,504,686 and Japanese Patent Publication 2000-315302A only adds the magnetic shield effect between the MR effect element and the electromagnetic coil element, and cannot reduce a leakage field from the magnetic pole on the leading side.

BRIEF SUMMARY OF THE INVENTION

Therefore, an object of the present invention is to provide a thin-film magnetic head capable of suppressing ATE caused due to narrower track width while ensuring sufficient controllability of the magnetic pole width and sufficient write field intensity, a head gimbal assembly (HGA) including the thin-film magnetic head, and a magnetic disk drive apparatus including the HGA.

Before describing the present invention, terms used herein will be defined. In a multilayer structure of magnetic head elements formed on/above the element formation surface of a substrate, a component located closer to the substrate than a layer is referred to as being located "lower" than or "below" that layer and a component located on the stacking side in relation to a layer is referred to as being located "upper" than or "above" that layer. For example, "a lower magnetic layer is formed on an insulating layer" means that the lower magnetic layer is located on the stacking side in relation to the insulating layer.

According to the present invention, a thin-film magnetic head is provided, which includes an electromagnetic coil element comprising: a lower magnetic layer formed on an element formation surface of a substrate having an air bearing surface (ABS); an upper magnetic layer; a write gap layer, an end portion on the ABS side of the write gap layer sandwiched between the lower magnetic layer and the upper magnetic layer; and a write coil layer passing through at least between the lower magnetic layer and the upper magnetic layer, the lower magnetic layer comprising: a lower yoke layer, a non-magnetic portion formed on an end portion on the ABS side of the lower yoke layer and extending to a head end surface on the ABS side; and a lower magnetic pole layer formed on the non-magnetic portion and on an end portion on the ABS side of the lower yoke layer, an upper surface of the lower magnetic pole layer being in contact with the write gap layer, and an end surface in the head end surface of the lower magnetic pole layer having a shape whose width along a track width direction is defined by a predetermined magnetic pole width.

In the above-described head having the non-magnetic portion and the lower magnetic pole layer, the lower magnetic pole layer, which determines a write field in conjunction with the upper magnetic layer, does not have a portion significantly protruding from the magnetic pole width, for example shoulders, and is isolated by the non-magnetic portion from the lower yoke layer. Therefore, even if the skew angle increases, a leakage field from the lower magnetic pole layer that can cause ATE is limited to such a degree that it has a negligibly small effect on adjacent tracks. Consequently, ATE is suppressed.

Further, the provision of the non-magnetic portion enables ATE to be suppressed while ensuring sufficient write field intensity without significantly increasing the neck depth of the lower magnetic pole layer. Therefore, the need for significantly increasing the initial thickness of the upper magnetic layer is eliminated. Furthermore, because the method requires a smaller amount of etching than conventional methods, unevenness of the magnetic pole width can be suppressed and therefore the controllability of the magnetic pole width is not impaired. That is, ATE can be suppressed while ensuring sufficient controllability of the magnetic pole width and sufficient write field intensity.

Further, in the thin-film magnetic head according to the present invention, the above-described shape whose width along the track-width direction is defined by the predetermined magnetic pole width is preferably a rectangle or approximate rectangle having a width equal to the magnetic pole width. And it is also preferable that a thickness $t_{IN}$ of the non-magnetic portion and a length $h_{IN}$ between an end on the ABS side and the opposite end of the non-magnetic portion satisfy the relation $h_{IN} < 2.5 \times t_{IN}$. When the thickness $t_{IN}$ and the length $h_{IN}$ of the non-magnetic portion meet this relation, the ABS leakage field can be further reliably suppressed while ensuring sufficient write field.

Further, a width along the track width direction of the non-magnetic portion is preferably greater than a track pitch. And a thickness $t_{LP}$ of the lower magnetic pole layer is preferably greater than or equal to 0.25 micrometer. By ensuring the thickness greater than 0.25 μm, ATE can be reduced reliably compared with the conventional head.

Further, in the thin-film magnetic head according to the present invention, an upper surface of the non-magnetic portion is preferably level with a top surface of an end portion on the ABS side of the lower yoke layer. And a lower surface of the non-magnetic portion is preferably level with a lower surface of the lower magnetic pole layer. Furthermore, it is preferable that the upper magnetic layer comprises: an upper magnetic pole layer whose lower surface is in contact with the write gap layer; and an upper yoke layer whose end portion on the ABS side is in contact with the upper magnetic pole layer.

According to the present invention, an HGA is further provided, which comprises the above-described thin-film magnetic head and a support mechanism for supporting the thin-film magnetic head.

According to the present invention, a magnetic disk drive apparatus is further provided, which comprises at least one HGA above described, at least one magnetic recording medium, and a recording/reproducing means for controlling read and write operations of the thin-film magnetic head to the at least one magnetic recording medium.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIGS. 4a to 4e show perspective views illustrating a configuration of a portion near the head end surface on the ABS side of alternatives of the thin-film magnetic head according to the present invention;

FIGS. 4f and 4g show alternatives of cross-sectional views of a non-magnetic portion according to the present invention;

FIGS. 6a1 to 6d, except FIGS. 6a2 and 6a3, show cross-sectional views on a plane parallel to the ABS, illustrating the process for forming end portions of the upper and lower magnetic layers of the electromagnetic coil element;

FIGS. 6a2 and 6a3 show cross sectional views taken along line A-A of FIG. 2;

DETAILED DESCRIPTION OF THE INVENTION

Figure 1:
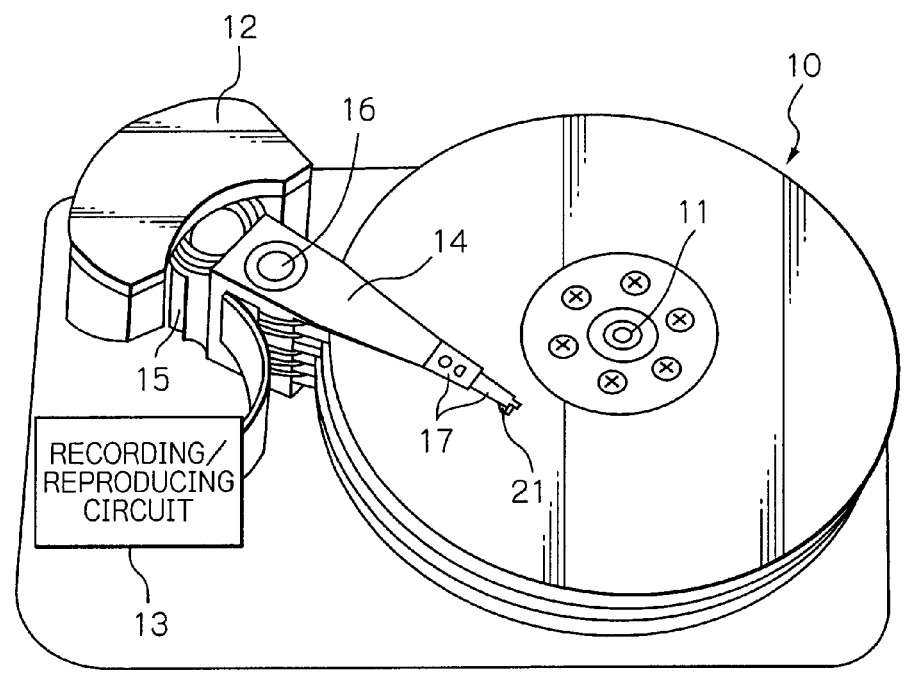
FIG. 1 shows a perspective view schematically illustrating a configuration of a main part of an embodiment of a magnetic disk drive apparatus according to the present invention.

FIG. 1 shows a perspective view schematically illustrating a configuration of a main part of an embodiment of a magnetic disk drive apparatus according to the present invention.

In FIG. 1, reference numeral 10 denotes multiple magnetic disks that rotates about the spindle of a spindle motor 11, 12 denotes an assembly carriage device for positioning a thin-film magnetic head (slider) 21 above a track, and 13 denotes a recording/reproducing circuit for controlling read/write operations of the thin-film magnetic head.

Provided in the assembly carriage device 12 are multiple drive arms 14. The drive arms 14 are capable of angular-pivoting about a pivot bearing axis 16 driven by a voice coil motor (VCM) 15 and are stacked along the axis 16. An HGA 17 is attached in the end of each drive arm 14. Provided in each HGA 17 is a thin-film magnetic head (slider) 21 in such a manner that it faces the surface of each magnetic disk 10. The numbers of magnetic disks 10, drive arms 14, HGAs 17, and sliders 21 may be one.

While not shown, the recording/reproducing circuit 13 includes a recording/reproduction control LSI, a write gate which receives record data from the recording/reproduction control LSI, a write circuit which outputs a signal from the write gate to an electromagnetic coil element for writing, which will be described later, a constant current circuit which supplies a sense current to an MR effect element for reading, which will also be described later, an amplifier which amplifies an element output voltage from the MR effect element, and a demodulator circuit which outputs reproduced data to the recording/reproduction control LSI.

Figure 2:
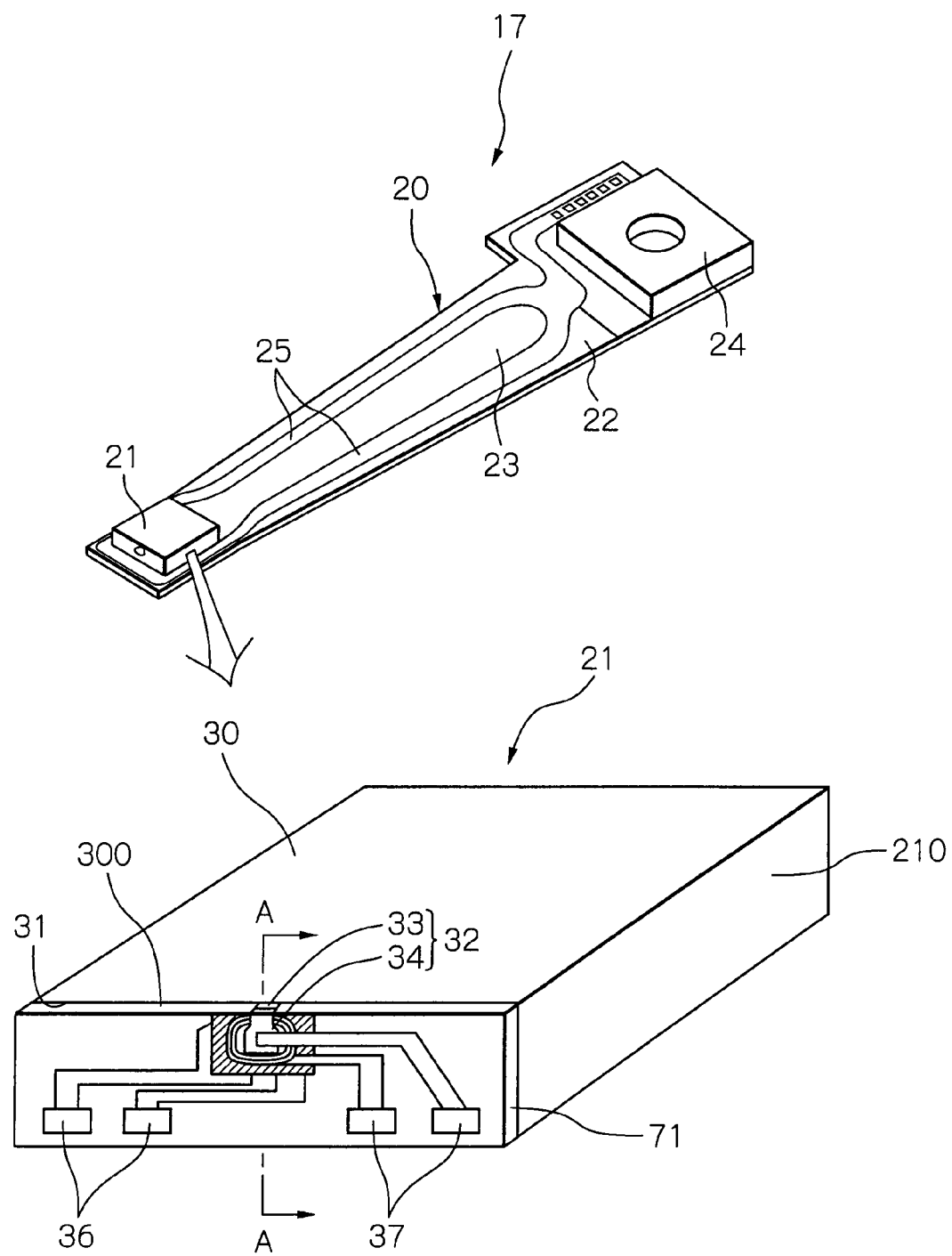
FIG. 2 shows a perspective view illustrating an embodiment of an HGA according to the present invention and a thin-film magnetic head (slider) attached on the end of the HGA.

FIG. 2 shows a perspective view illustrating an embodiment of an HGA according to the present invention and a thin-film magnetic head (slider) attached on the end of the HGA.

As shown in FIG. 2, the HGA 17 includes the slider 21 that has a magnetic head element and is fixed on the end portion of a suspension 20. Signal electrodes of the slider 21 are electrically connected to one end of a wiring member 25.

The suspension 20 includes a load beam 22, an flexure 23 with elasticity fixed on and supported by the load beam 22, a base plate 24 provided on the base of the load beam 22, and a wiring member 25 which is provided on the flexure 23 and consists of lead conductors and connection pads electrically connected to the ends of the lead conductors. While not shown, a head drive IC chip may be attached on a position between the ends of the suspension 20.

Also in FIG. 2, the thin-film magnetic head (slider) 21 includes a slider substrate 210 having an air bearing surface (ABS) 30 processed so as to provide an appropriate flying height and an element formation surface 31, a magnetic head element 32 formed on/above the element formation surface 31, and pairs of signal electrodes 36 and 37 exposed in the surface of an overcoat layer 71 formed on the element formation surface 31. The magnetic head element 32 includes an MR effect element 33 for reading data and an electromagnetic coil element 34 for writing data. The signal electrodes 36 and 37 are connected to the MR effect element 33 and the electromagnetic coil element 34, respectively.

One end of each of the MR effect element 33 and the electromagnetic coil element 34 extends to the head end surface 300 on the ABS 30 side. These ends face a magnetic disk, and sense a signal field from the magnetic disk to read data and apply a signal field to the disk to write data.

Figure 3A:
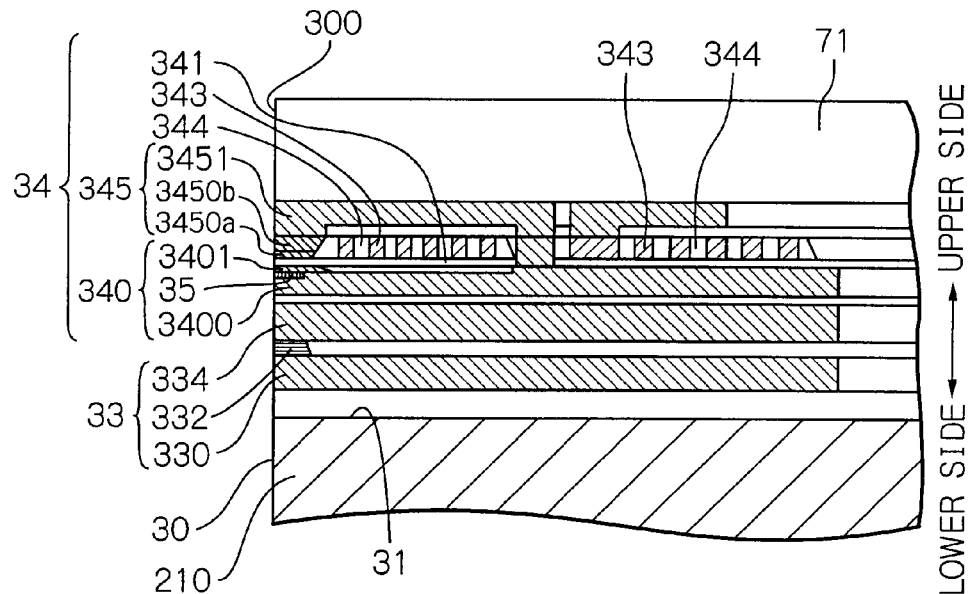
FIG. 3a shows a cross-sectional view taken along line A-A in FIG. 2, illustrating a configuration of a main part of the thin-film magnetic head according to the present invention.
Figure 3B:
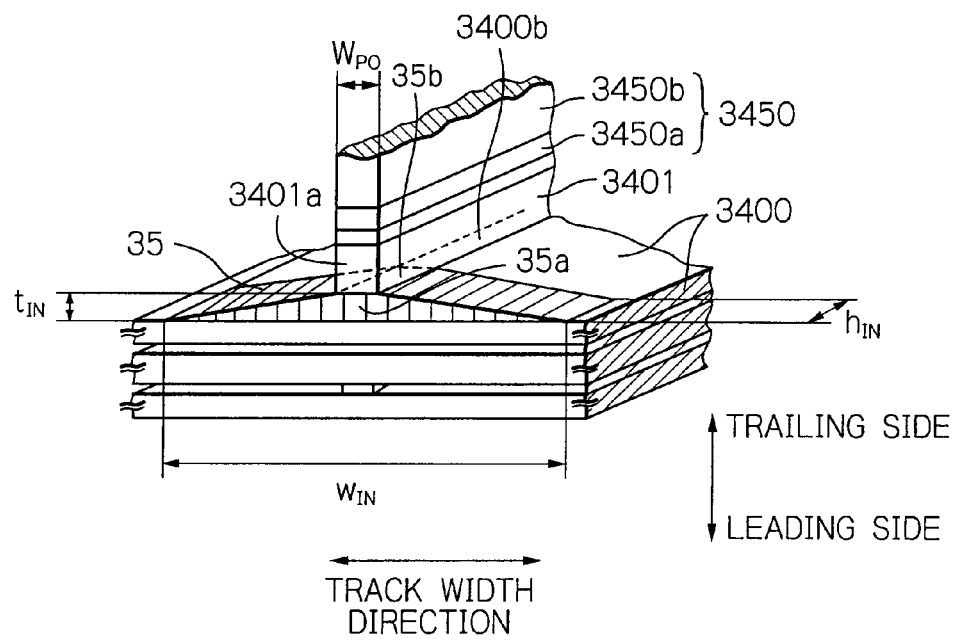
FIG. 3b shows a perspective view of the configuration.

FIG. 3a shows a cross-sectional view taken along line A-A in FIG. 2, illustrating a configuration of a main part of the thin-film magnetic head according to the present invention. FIG. 3b shows a perspective view of the configuration, in which the head end surface 300 is at the front.

In FIG. 3a, reference numeral 210 denotes a slider substrate, which has an ABS 30 facing the surface of a magnetic disk. An MR effect element 33 for reading, an electromagnetic coil element 34 for writing, and an overcoat layer 71 that protects these elements are formed on/above an element formation surface 31, which is a side surface when the ABS 30 of the slide substrate 210 is at the bottom.

The MR effect element 33 includes an MR effect multilayer 332, and a lower shield layer 330 and an upper shield layer 334 sandwiching the MR effect multilayer 332. The MR effect multilayer 332 includes a current-in-plane (CIP) giant magnetoresistive (GMR) effect multilayered film, a current-perpendicular-to-plane (CPP) GMR effect multilayered film, or a tunnel magnetoresistive (TMR) effect multilayered film, and senses a signal field from the magnetic disk with an extremely high sensitivity. The upper and lower shield layers 334 and 330 prevent the MR effect multilayer 332 from receiving an external magnetic field that causes noise.

If the MR effect multilayer 332 includes a CIP-GMR effect multilayered film, upper and lower shield gap layers for insulation are provided between the MR effect multilayer 332 and respective upper and lower shield layers 334 and 330. Further, an MR lead conductor layer is formed for supplying a sense current to the MR effect multilayer 332 and bringing out a reproduction output. On the other hand, when the MR effect multilayer 332 includes a CPP-GMR effect multilayered film or a TMR effect multilayered film, the upper and lower shield layers 334 and 330 also function as upper and lower electrodes, respectively. In this case, the upper and lower shield gap layers and the MR lead conductor layer are not needed and are omitted. However, an insulating layer is formed between the upper and lower shield layers and on the side opposite to the head end surface 300 with respect to the MR effect multilayer 332, and further, insulating layers, or bias insulating layers and hard bias layers for applying a bias magnetic field may be formed on both sides along the track-width direction of the MR effect multilayer 332.

The magnetic coil element 34 includes a lower magnetic layer 340, a write gap layer 341, a write coil layer 343, a coil insulating layer 344, and an upper magnetic layer 345. The write coil layer 343 is formed in such a manner that it passes at least between the lower magnetic layer 340 and the upper magnetic layer 345. The lower magnetic layer 340 and the upper magnetic layer 345 function as a magnetic flux guide for a magnetic flux excited by the write coil layer 343.

The lower magnetic layer 340 includes a lower yoke layer 3400, a non-magnetic portion 35, which is one of the features of the present invention, formed on the end portion on the ABS 30 side (head end surface 300 side) of the lower yoke layer 3400 and extending to the head end surface 300, and a lower magnetic pole layer 3401 which is formed on the non-magnetic portion 35 and on the end portion on the ABS 30 side of the lower yoke layer 3400 and whose upper surface is in contact with the surface of the write gap layer 341.

The saturation magnetic flux density of the lower magnetic pole layer 3401 is set higher than that of the lower yoke layer 3400, and is at least 2.0 teslas (T). The upper magnetic layer 345 includes an upper magnetic pole layer 3450 whose lower surface is in contact with the surface of the write gap layer 341, and an upper yoke layer 3451 whose end portion on the ABS 30 side is in contact with the surface of the upper magnetic pole layer 3450. The upper magnetic pole layer 3450 consists of a first upper magnetic pole layer 3450a and a second upper magnetic pole layer 3450b formed on the first upper magnetic pole layer 3450a. The saturation magnetic flux density of at least the first upper magnetic pole layer 3450a is higher than that of the upper yoke layer 3451 and is at least 2.0 T, for example. The upper magnetic pole layer 3450 may consists of a single layer instead of the two layers.

The lower magnetic pole layer 3401 and the upper magnetic pole layer 3450 sandwich the end portion on the ABS 30 side (head end surface 300 side) of the write gap layer 341. A leakage magnetic field from this end portion of the write gap layer 341 performs a write operation onto the magnetic disk. The ends on the magnetic disk side of the lower magnetic pole layer 3401 and upper magnetic pole layer 3450 extend to the head end surface 300, which are coated with ultrathin protective film made of a material such as diamond-like carbon (DLC). While the write coil layer 343 is shown as a single layer in FIG. 3a, it may consists of two or more layers or a helical coil.

A non-magnetic layer made of an insulating material or a metal is provided between the upper shield layer 334 and the lower magnetic layer 340 for isolating the MR effect element 33 from the electromagnetic coil element 34. However, the non-magnetic layer is not necessarily needed and may be omitted and the upper shield layer may also be used as the lower magnetic layer.

The non-magnetic portion 35 is made of a non-magnetic insulating material such as SiO, $SiO_2$, $Al_2O_3$, SiN, AlN or DLC, or a non-magnetic metal such as Ti, Zr, Hf, Nb, Ta, Cr, Mo, W, Ir, Cu, Ag, Au or Al, or an alloy of two or more of these elements.

Referring to FIG. 3b, one end of the non-magnetic portion 35 extends to the head end surface 300 (the front of the perspective view of FIG. 3b) and has a surface 35a that faces a recording medium. The width $W_{IN}$ of the non-magnetic portion 35 along the track-width direction is chosen to be sufficiently wider than the magnetic pole width $W_{PO}$ that defines the track width of the lower magnetic pole layer 3401 and the upper magnetic pole layer 3450, and sufficiently wider than the track pitch of a recording medium. The width $W_{IN}$ may be in the range between approximately 0.5 μm (micrometer) and approximately 30 μm. The thickness $t_{IN}$ (μm) and the length $h_{IN}$ (μm) are chosen such that the relation $$h_{IN} < 2.5 \times t_{IN} \quad (1)$$

is satisfied as will be detailed later, where $t_{IN}$ denotes the thickness of the non-magnetic portion (the maximum length in the stacking direction) and $h_{IN}$ denotes the length between the end (end surface 35a) on the ABS side (on the head end surface 300 side) of the non-magnetic portion 35 and the opposite end.

Referring to FIG. 3b, the end surface 3401a of the lower magnetic pole layer 3401 at the head end surface 300 is above the end surface of the non-magnetic portion 35 and is in the shape of a rectangle or approximate rectangle whose width along the track-width direction is defined by a given magnetic pole width $W_{PO}$. Here, a shape slightly deformed from rectangle, such as a trapezoidal or inverted trapezoidal shape having a slightly inclined or uneven side surface as a result of a manufacturing process also falls within the category of rectangle or approximate rectangle. Furthermore, a shape having shoulders with a thickness of 0.1 μm or less formed at the bottom portion of the layer also falls within the category.

In FIG. 3b, the upper surface 35b of the non-magnetic portion 35 is level with the top surface 3400b in the end portion on the ABS side of the lower yoke layer 3400.

The provision of the non-magnetic portion 35 and the lower magnetic pole layer 3401 described above suppresses ATE while ensuring sufficient write field. In fact, the lower magnetic pole layer 3401, which determines a write field in conjunction with the upper magnetic pole layer 3450, does not have a portion significantly protruding from the magnetic pole width $W_{PO}$, for example shoulders, and is isolated by the non-magnetic portion 35 from the lower yoke layer 3400. Therefore, even if the skew angle increases, a leakage field from the lower magnetic pole layer 3401 which can cause ATE (hereinafter referred to as an ATE leakage field (see FIG. 7b)) is limited to such a degree that it has a negligibly small effect on adjacent tracks. Consequently, ATE is suppressed. Especially if the thickness $t_{IN}$ and the length $h_{IN}$ of the non-magnetic portion 35 meet the relation represented by Expression (1), the ABS leakage field can be further reliably suppressed while ensuring an write field, as will be described later in detail.

FIGS. 4a to 4e show perspective views illustrating a configuration of a portion near the head end surface on the ABS side of alternatives of the thin-film magnetic head according to the present invention. FIGS. 4f and 4g show alternatives of cross-sectional views of a non-magnetic portion according to the present invention. The cross-sectional views correspond to those taken along line A-A in FIG. 2.

In the thin-film magnetic head in FIG. 4a, upper and lower magnetic pole layers 420 and 401, and a lower yoke layer 400 in the vicinity of the head end surface on the ABS side (the front of the perspective view) are the same as their equivalents in FIG. 3b. However, shoulders 43b of a non-magnetic portion 43 are not inclined with respect to the element formation surface, unlike the non-magnetic portion 35 in FIG. 3b. This structure also reduces an ATE leakage field from the lower magnetic pole layer 401 to such a degree that it has a negligibly small effect on adjacent tracks. Consequently, the ATE leakage field can be suppressed while ensuring sufficient write field. While a write coil layer 44 is formed above a write gap layer 41 in this alternative, the write coil layer 44 may be formed below the write gap layer 41.

Referring to FIG. 4b, a non-magnetic portion 46 in the vicinity of the head end surface on the ABS side has a neck portion 46c at its top that has the same width $W_{PO}$ as that of the lower magnetic pole layer 451. This structure also can suppress the ATE leakage field while ensuring sufficient write field.

In a thin-film magnetic head shown in FIG. 4c, in the vicinity of the head end surface on the ABS side, each shoulder 50b of a non-magnetic portion 50 is contiguous to each shoulder 470b of a lower yoke layer 470 to form one inclined surface on each side. This structure also reduces an ATE leakage field from the lower magnetic pole layer 471 to such a degree that it has a negligibly small effect on adjacent tracks. Consequently, the ATE leakage field can be suppressed while ensuring sufficient write field. Write coil layers 51 and 52 in FIG. 4c are provided above and below a write gap layer 48 in FIG. 4c. Write coil layers may be provided as two layers like this or one of them may be omitted.

Referring to FIG. 4d, instead of the lower yoke layer of FIG. 3b, a portion of a lower magnetic pole layer 531 is provided at the back of a non-magnetic portion 54 when viewed from the head end surface on the ABS side in the vicinity of the head end surface on the ABS side. The bottom surface of the non-magnetic portion 54 is level with the bottom surface of a lower magnetic pole layer 531. This structure also can suppress the ATE leakage field while ensuring sufficient write field.

In a thin-film magnetic head in FIG. 4e, upper and lower magnetic pole layers 570 and 561 and a non-magnetic portion 58 in the vicinity of the head end surface on the ABS side are the same as their equivalents shown in FIG. 3b. However, a lower yoke layer 560 also acts as an upper shield layer of an MR effect multilayer 55. This configuration also can suppress the ATE leakage field while ensuring sufficient write field.

Cross-sectional shapes of non-magnetic portions according to the present invention will be described below. Cross-sections of non-magnetic portions described above and shown in FIGS. 3b and 4a to 4e taken along line A-A of FIG. 2 are rectangular in shape. However, a non-magnetic portion having a profile whose bottom corners on the side far from the head end surface 300 are somewhat round or round to a degree that the bottom surface of the non-magnetic portion is convexly curved like a non-magnetic portion 59 shown in FIG. 4f, also can suppress the ATE leakage field and therefore falls within the scope of the present invention. Furthermore, a non-magnetic portion whose bottom surface is an inclined plane or somewhat concavely curved like a non-magnetic portion 59' shown in FIG. 4g, can also reduce the ATE leakage field and therefore falls within the scope of the present invention.

FIG. 5a to 5f show cross-sectional views taken along line A-A of FIG. 2, illustrating a part of a process for manufacturing the thin-film magnetic head according to the present invention.

Figure 5A:
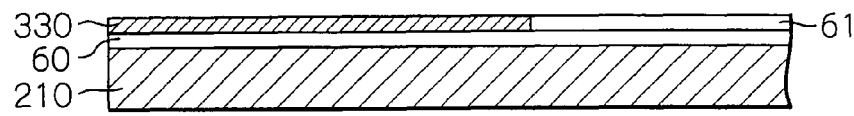
FIG. 5a to 5f show cross-sectional views taken along line A-A of FIG. 2, illustrating a part of a process for manufacturing the thin-film magnetic head according to the present invention.

First, as shown in FIG. 5a, an under insulating layer 60 of a material such as $Al_2O_3$ or $SiO_2$ with a thickness of approximately 0.1 to 5 μm is formed on a slider substrate (wafer substrate) 210 made of a material such as AlTiC ($Al_2O_3$—TiC) by using a method such as sputtering. Then a lower shield layer 330 of NiFe, CoFeNi, CoFeN, or FeZrN or a multilayer film of at least two of these with a thickness of approximately 0.5-3 μm is formed on the under insulating layer 60 by using a method such as frame plating. Then, an insulating film of a material such as $Al_2O_3$ or $SiO_2$ is formed by using a method such as sputtering and is planarized by chemical mechanical polishing (CMP) or the like to form a planarizing layer 61.

Figure 5B:
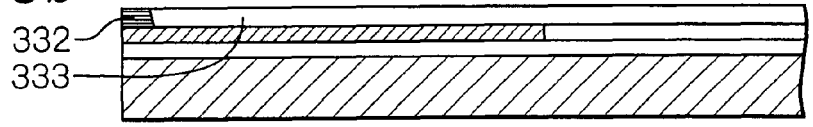

Then, as shown in FIG. 5b, an MR effect multilayer 332 and an insulating layer 333 are formed on the lower shield layer 330. If required, a bias insulating layer and a hard bias layer, not shown, are formed on both sides of the MR effect multilayer 332 along the track width direction. When the MR effect multilayer includes a TMR effect multilayered film, the MR effect multilayer 332 is formed by depositing a antiferromagnetic layer, a pinned layer whose magnetization direction is fixed by the antiferromagnetic layer, a tunnel barrier layer of a non-magnetic dielectric material, and a free layer which is coupled with the pinned layer by tunnel exchange coupling through the tunnel barrier layer, in this order.

Figure 5C:
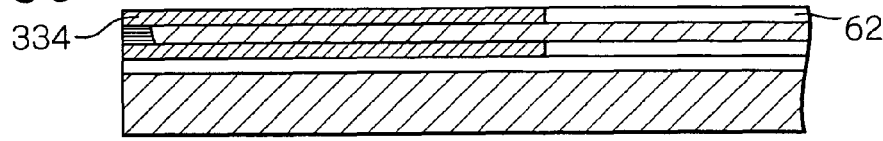

Then, as shown in FIG. 5c, an upper shield layer 334 of NiFe, CoFeNi, CoFe, FeN or FeZrN, for example or a multilayer film of at least two of these with a thickness of approximately 0.5-3 μm is formed by using frame plating. With this, formation of the MR effect element 33 is completed. Then, an insulating film of a material such as $Al_2O_3$ or $SiO_2$ is formed by using a method such as sputtering and is planarized to form a planarizing layer 62.

Figure 5D:
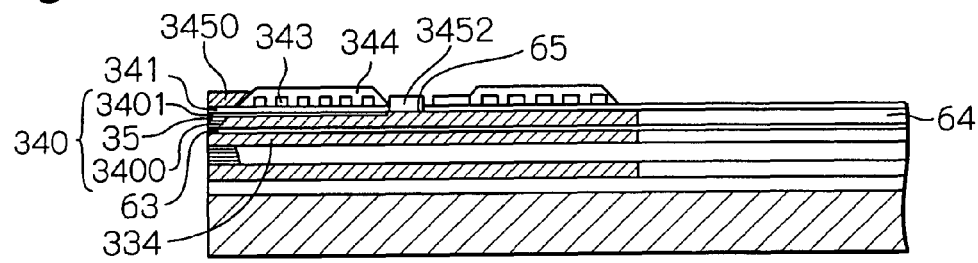

Then, as shown in FIG. 5d, a non-magnetic layer 63 of an insulating material such as $Al_2O_3$, $SiO_2$, AlN or DLC or a metal material such as Ta or Pt with a thickness of approximately 0.5-0.5 μm is formed on the upper shield layer 334 to isolate the MR effect element 33 from an electromagnetic coil 34 that will be formed later. Then, a lower magnetic pole layer 340 of a material such as NiFe, CoFeNi, CoFe, FeN, or FeZrN or a multilayer film of at least two of these with a thickness of approximately 0.5-3 μm is formed on the non-magnetic layer 63 by using a method such as sputtering or frame plating. The lower magnetic layer 340 consists of a lower yoke layer 3400, a non-magnetic portion 35, and a lower magnetic pole layer 3401. A method for forming this structure will be described later in detail with reference to FIGS. 6a1 to 6d. Then, an insulating film of a material such as $Al_2O_3$ or $SiO_2$ is formed by using a method such as sputtering and then is planarized by using a method such as CMP to form a planarizing layer 64.

Next, as shown in FIG. 5d, a write gap layer 341 of an insulating material such as $Al_2O_3$, $SiO_2$, AlN or DLC is formed with a thickness approximately 0.01-0.1 μm by using a method such as sputtering or CVD. Then, a portion of the write gap layer 341 is removed by using dry etching such as ion milling or reactive ion etching (RIE) through a resist mask pattern to expose the lower magnetic layer 340 to form a back gap portion 65. Then, a write coil layer 343 of a material such as Cu with a thickness of approximately 1-5 μm is formed by using a method such as frame plating.

Then, as shown in FIG. 5d, a coil insulating layer 344 of a heat-cured resist such as a novolac-type resist with a thickness of approximately 0.5-7 μm is formed by using a method such as photolithography. Then, an upper magnetic pole layer 3450 and a back contact magnetic pole layer 3452 of a material such as NiFe, CoFeNi, CoFe, FeN or FeZrn or a multilayer of at least two of these materials with a thickness of approximately 0.5-3 μm is formed on the write gap layer 341 by using pattern plating such as frame plating. A method for forming the upper magnetic pole layer 3450 will be described later in further detail with reference to FIGS. 6a1 to 6d.

Figure 5E:
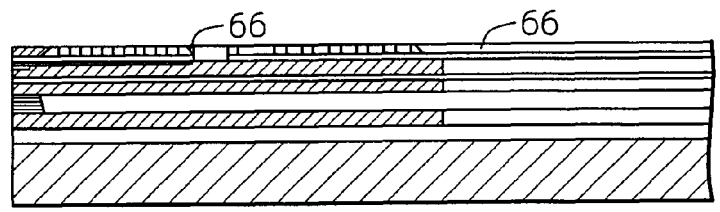
Figure 5F:
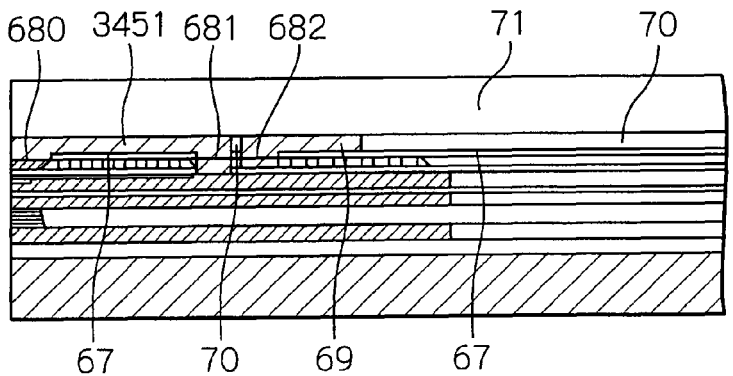

Then as shown in FIG. 5e, an insulating film of a material such as $Al_2O_3$ or $SiO_2$ is formed by using a method such as sputtering and is then planarized by using a method such as CMP to form a planarizing layer 66. As shown in FIG. 5f, an insulating layer 67 of a material such as $Al_2O_3$ or $SiO_2$ is then formed by using a method such as sputtering or CVD. Then the under layer is exposed by using dry etching such as ion milling or RIE through a resist mask pattern to form an upper magnetic pole layer—yoke junction 680, a back contact magnetic pole layer—yoke junction 681, and a coil lead 682.

Then as shown in FIG. 5f, an upper yoke layer 3451 and a coil lead layer 69 of a material such as NiFe, CoFeNi, CoFe, FeN or FeZrN or a multilayer film of at least two of these materials with a thickness of approximately 0.5 to 3 μm are formed by using a method such as frame plating. The coil lead layer 69 may be separately formed from a material such as Cu by using a method such as frame plating. With the foregoing process, the upper magnetic pole 3450, the back contact magnetic pole layer 3452, and the upper yoke layer 3451 are formed and thus the formation of the upper magnetic layer 345 is completed.

Then, an insulating film of a material such as $Al_2O_3$ or $SiO_2$ is formed by using a method such as sputtering and is planarized by using a method such as CMP to form a planarizing layer 70. An overcoat layer 71 of a material such as $Al_2O_3$ or $SiO_2$ is formed on the planarized surface by using a method such as sputtering. Thus, the process for forming the MR effect element and electromagnetic coil element is completed.

FIGS. 6a1 to 6d, except FIGS. 6a2 and 6a3, show cross-sectional views on a plane parallel to the ABS, illustrating the process for forming end portions of the upper and lower magnetic layers of the electromagnetic coil element 34. FIGS. 6a2 and 6a3 show cross sectional views taken along line A-A of FIG. 2.

As shown in FIG. 6a1, first a lower yoke film 80 with a thickness of approximately 0.5 to 3 μm is formed on the element formation surface of the slider substrate (not shown) by using sputtering or plating, for example. A non-magnetic portion film 81 with a thickness of approximately 0.1 to 0.4 μm is formed on the lower yoke film 80 by using a method such as sputtering. In forming the non-magnetic portion film 81, a concave portion of a given size may be formed in the lower yoke film 80 near the head end surface 300 as shown in FIG. 6a2 by using photolithography and ion milling, for example, the material of the non-magnetic portion film 81 is deposited on the concave portion, and then the surface may be planarized by using CMP, for example. Alternatively, as shown in FIG. 6a3, a first lower yoke film 80a' may be formed, and then a non-magnetic portion film 81 may be formed on the first lower yoke film 80a' near the head end surface 300 by using sputtering and photolithography, for example, then a second lower yoke film 80b' may be formed and then planarized by using CMP, for example.

As shown in FIG. 6b, a lower magnetic pole film 82 with a thickness of approximately 0.25 to 0.6 μm and a high saturation magnetic flux density such as 2.0 T or higher is formed on the non-magnetic portion film 81 and the lower yoke film 80, and then a gap film 83 with a thickness of approximately 0.01 to 0.1 μm is formed. As shown in FIG. 6c, a plate electrode film 84 of a material having a high saturation magnetic flux density such as 2.0 T or higher is formed on the write gap layer 83 by using sputtering for example, then an upper magnetic pole film 85 having a thickness of approximately 2.0 to 4.0 μm and a width along the track-width direction of approximately 0.2 to 0.4 μm is formed by using pattern plating such as frame plating with the plate electrode film 84 as an electrode.

As shown in FIG. 6d, an ion beam etching such as ion milling with the upper magnetic film 85 as a mask is performed to trim the lower magnetic pole film 82, plate electrode film 84, and upper magnetic pole film 85, which forms a lower magnetic pole layer 3401, first and second upper magnetic pole layers 3450a and 3450b (upper magnetic pole layer 3450) having a magnetic pole width $W_{PO}$ along the track-width direction of approximately 0.15 to 0.3 μm. In this etching, an ion beam is applied first at an incident angle perpendicular or approximately perpendicular to the stack surface (element formation surface of the substrate), and then the incident angle is changed to a given slanting angle to the stack surface. With this, a proper pattern can be formed and reattachments on side surfaces can be removed. It should be noted that the "trimming" means that the magnetic layer is processed to reduce its width along the track-width direction to a narrowed width uniform with respect to the film thickness direction. During this trimming, the layers are etched in the depth direction (film thickness direction) as well. However, the etching ratio between the width and depth can be varied and adjusted by controlling the combinations of the incident angle and amount of the ion beam.

As a result of this etching, formed is a non-magnetic portion 35 in contact with the bottom surface of the lower magnetic pole layer 3401. The shape of the non-magnetic portion 35, especially the angle of inclination of shoulders 35a and whether or not a neck portion near the boundary with the lower magnetic pole layer 3401 is formed can be varied and adjusted by controlling conditions such as the etching rate of the material of the non-magnetic portion 35, the incident angle, and amount of the ion beam. A reactive ion etching may be used instead of the ion beam etching in the etching process described above to accomplish a forming process similar to the one described above. The process for manufacturing the thin-film magnetic head according to the present invention is not limited to the one described above, that is, other materials, thicknesses, and methods can be used.

According to the forming method described above, the provision of the non-magnetic portion 35 enables ATE to be suppressed while ensuring sufficient write field intensity without significantly increasing the neck depth of the lower magnetic pole layer 3401. Therefore, the need for significantly increasing the initial thickness of the upper magnetic pole film 85 is eliminated. Furthermore, because the method requires a smaller amount of etching than conventional methods, unevenness of the magnetic pole width $W_{PO}$ can be suppressed and therefore the controllability of the magnetic pole width $W_{PO}$ is not impaired.

The effect of suppressing ATE in the thin-film magnetic head according to the present invention will be described below by using the results of simulations of write fields and leakage fields in practical examples of the present invention and the conventional examples.

(Simulations of Write Field and ATE Leakage Field)

Figure 7A:
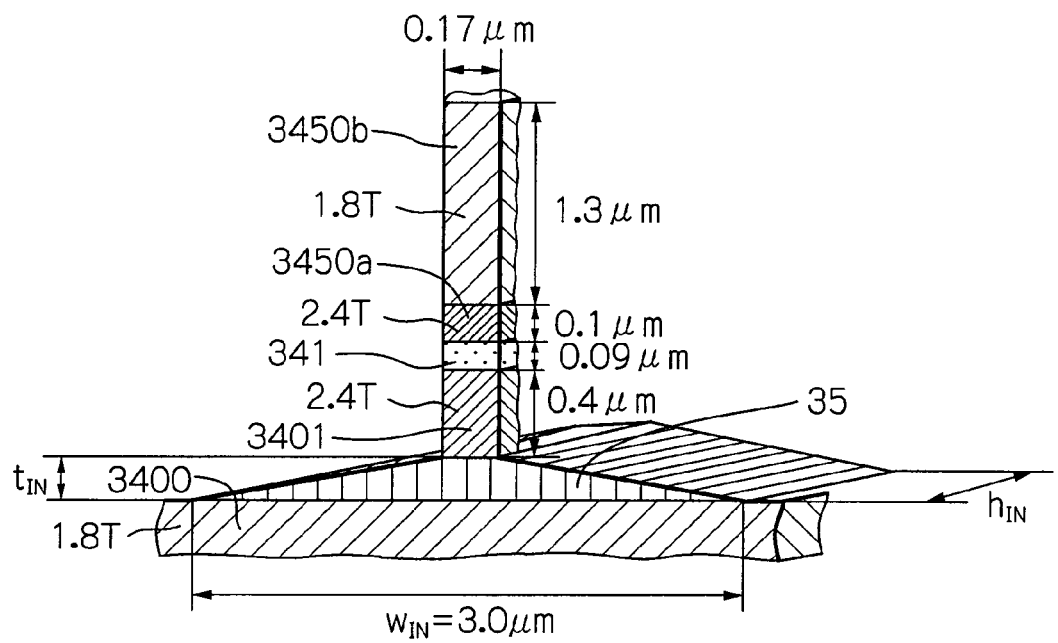
FIG. 7a shows a structure of a magnetic pole in the vicinity of the head end surface on the ABS side of a thin-film magnetic head according to the present invention.
Figure 7B:
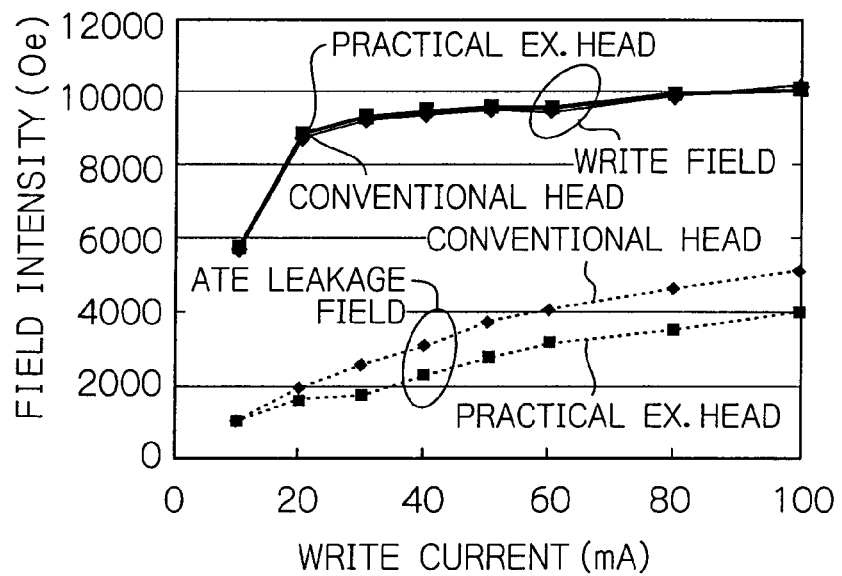
FIG. 7b shows a graph of the relationship between the write current and the write field intensity and ATE leakage magnetic field, in the head according to the present invention shown in FIG. 7a and a conventional head.

FIG. 7a shows a structure of a magnetic pole in the vicinity of the head end surface on the ABS side of a thin-film magnetic head according to the present invention. FIG. 7b shows a graph of the relationship between the write current and the write field intensity and ATE leakage magnetic field, in the head according to the present invention shown in FIG. 7a (practical example head) and a conventional head.

The dimensions of layers constituting the magnetic pole of the head used in the simulations shown in FIGS. 7b, 8 and 9 are indicated in FIG. 7a. Referring to FIG. 7a, the thickness of the lower magnetic pole layer 3401 with a saturation magnetic flux density Bs of 2.4 T, which is also the neck depth ND, is 0.4 μm, the thickness of the write gap layer 341 (gap length) is 0.09 μm, the thickness of the first upper magnetic pole layer 3450a (Bs=2.4 T) is 0.1 μm, the thickness of the second upper magnetic pole layer 3450b (Bs=1.8 T) is 1.3 μm, and the width of these layers along the track-width direction is 0.17 μm. The saturation magnetic flux density Bs of the lower yoke layer 3400 is 1.8 T. The non-magnetic portion 35 has the shape of a trapezoid with the bottom base of 3.0 μm and the top base of 0.17 μm. In the simulations described below, the thickness $t_{IN}$ and length $h_{IN}$ of the non-magnetic portion 35 are varied. In the simulation in FIG. 7b, the thickness $t_{IN}$ is 0.2 μm and the length $h_{IN}$ is 0.3 μm. The cross-section taken along line A-A of FIG. 2 is rectangular in shape.

The conventional head used in the simulation does not have a non-magnetic section but has a configuration in which a lower yoke layer 3400 extends into the position where the non-magnetic portion 35 of FIG. 7a would be provided.

Referring to FIG. 7b, the write field intensities of both of the practical example head and the conventional head rapidly increase with increasing write current, and then gradually approach predetermined values. The curves of both are substantially overlap each other, which shows that sufficient write field is ensured in the practical example head as compared with the conventional head although the non-magnetic portion 35 is provided in the practical example head.

The ATE leakage field intensities of these heads will be described next. The ATE leakage field intensity can be defined as the maximum value of a magnetic field in an area on the head end surface on the ABS side where the magnetic field intensity distribution is the highest near the end surface of the lower magnetic pole layer 3401 except the region near the write gap layer at the top of the lower magnetic pole layer 3401. Referring to FIG. 7b, the ATE leakage field intensities monotonically increase both in the practical example head and the conventional head. However, the ATE leakage field intensity in the practical example head is lower than that in the conventional head under the same write current condition.

From these results, it can be understood that the thin-film magnetic head according to the present invention is capable of suppressing ATE as compared with the conventional head while ensuring sufficient write field intensity comparable to the conventional head.

Figure 8A:
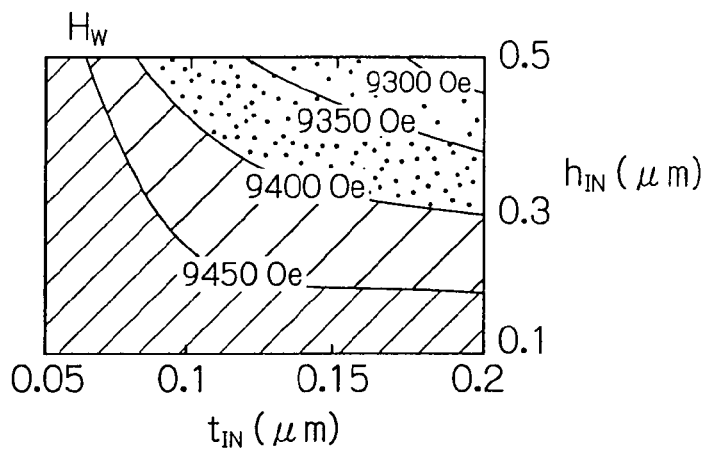
FIG. 8a shows a graph of the relationship between the thickness $t_{IN}$ and length $h_{IN}$ of the non-magnetic portion and the write field intensity $H_W$ in the head according to the present invention.
Figure 8B:
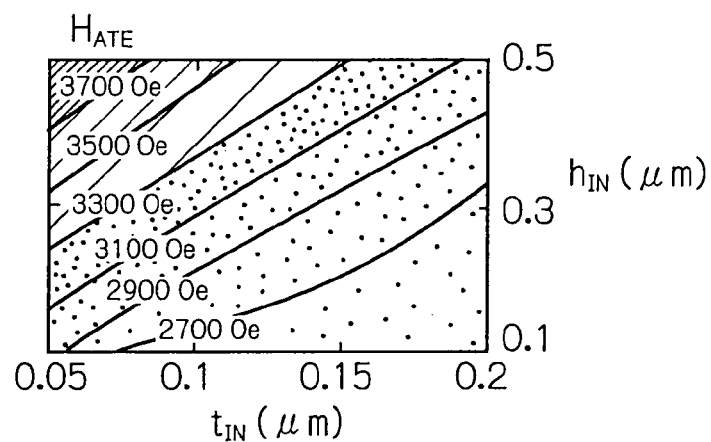
FIG. 8b shows a graph of the relationship between the thickness $t_{IN}$ and length $h_{IN}$ of the non-magnetic portion and the ATE leakage field intensity $H_{ATE}$ in the head according to the present invention.
Figure 8C:
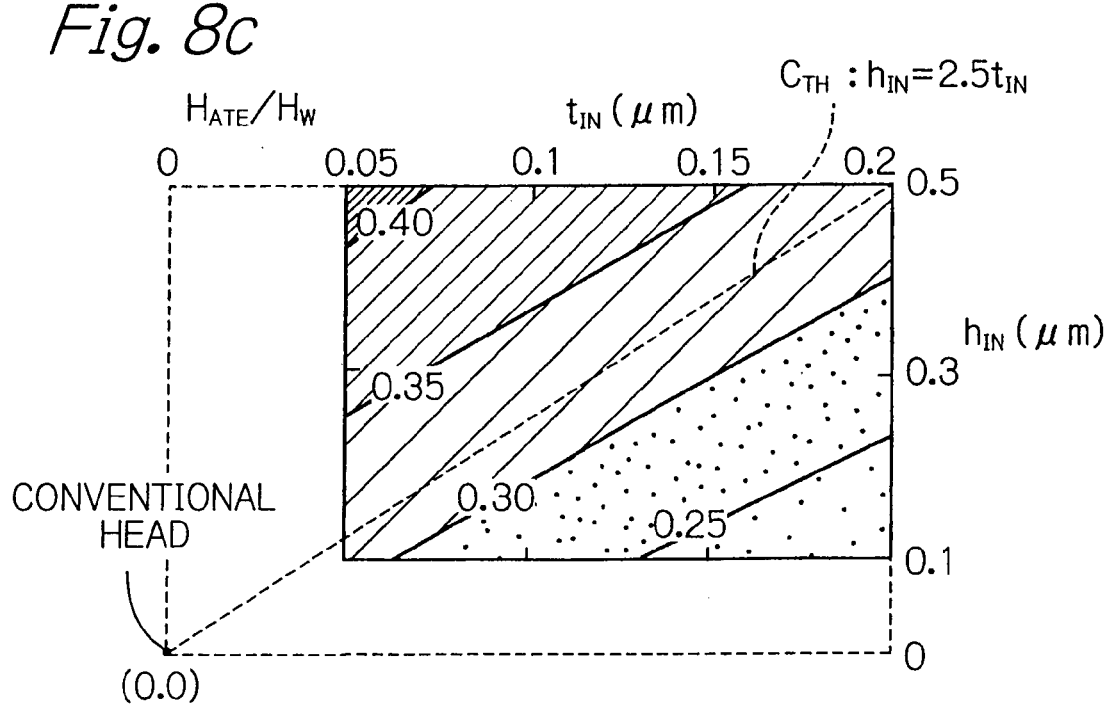
FIG. 8c shows a graph of the relationship between the thickness $t_{IN}$ and length $h_{IN}$ of the non-magnetic portion and $H_{ATE}/H_W$.

FIG. 8a shows a graph of the relationship between the thickness $t_{IN}$ and length $h_{IN}$ of the non-magnetic portion 35 and the write field intensity $H_W$ in the head according to the present invention (practical example head); FIG. 8b shows a graph of the relationship between the thickness $t_{IN}$ and length $h_{IN}$ of the non-magnetic portion 35 and the ATE leakage field intensity $H_{ATE}$ in the head according to the present invention; and FIG. 8c shows a graph of the relationship between the thickness $t_{IN}$ and length $h_{IN}$ of the non-magnetic portion 35 and $H_{ATE}/H_W$. $H_{ATE}$ and $H_W$ in these graphs are values at a write current of 40 mA.

Referring to FIG. 8a, the write field intensity $H_W$ increases as the thickness $t_{IN}$ and length $h_{IN}$ of the non-magnetic portion 35 decrease (as the position on the graph approaches the bottom left of the graph). Referring to FIG. 8b, the ATE leakage field intensity $H_{ATE}$ increases as the thickness $t_{IN}$ decreases and the length $h_{IN}$ increases (as the position on the graph approaches the top right of the graph).

A key factor in adjusting the write current value for actual writing is the ratio $H_{ATE}/H_W$ between the write field intensity $H_W$ and the ATE leakage field intensity $H_{ATE}$. The smaller the ratio, the lower ATE during writing. Referring to FIG. 8c, the ratio $H_{ATE}/H_W$ decreases as the thickness $t_{IN}$ increases and the length $h_{IN}$ decreases (as the position on the graph approaches the bottom right of the graph). The boundary line $C_{TH}$ (dashed line) passes through the position at which the thickness $t_{IN}$ and the length $h_{IN}$ are zero (origin), which is corresponding to the conventional head. Thus, ATE can be reliably reduced in the head according to the present invention compared with conventional heads in the region below the boundary line $C_{TH}$, which is in the range where the relation $$h_{IN}(\mu m) < 2.5 \times t_{IN}(\mu m) \tag{1}$$

holds.

Next, the size and shape of the lower magnetic pole layer 3401 will be considered below.

Figure 9A:
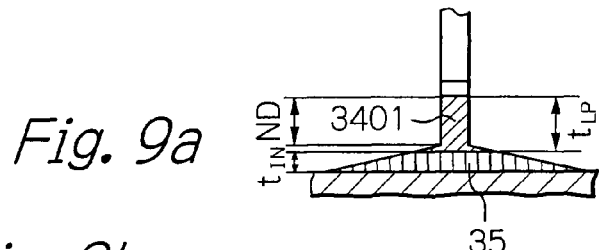
FIG. 9a shows a schematic diagram defining the neck depth ND and thickness $t_{LP}$ of the lower magnetic pole layer.
Figure 9B:
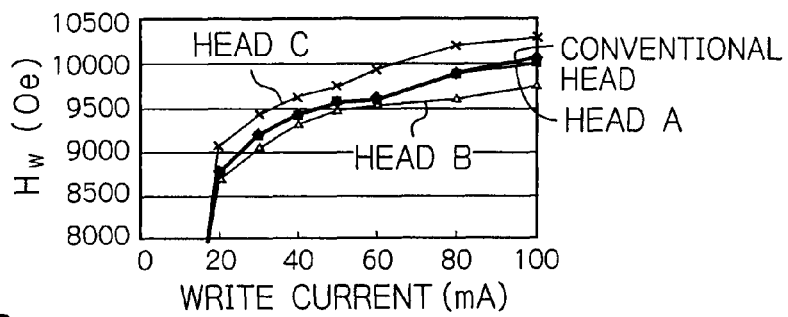
FIGS. 9b to 9d show graphs of the relationship between the write current, and the write field density $H_W$, ATE leakage field intensity $H_{ATE}$ and ratio $H_{ATE}/H_W$, in heads having various ND and $t_{LP}$ and a conventional head.
Figure 9C:
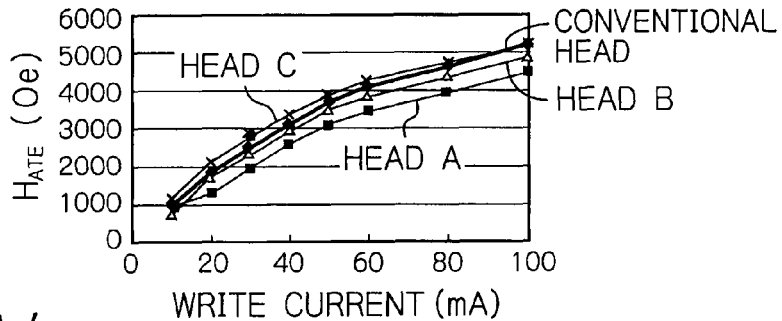
Figure 9D:
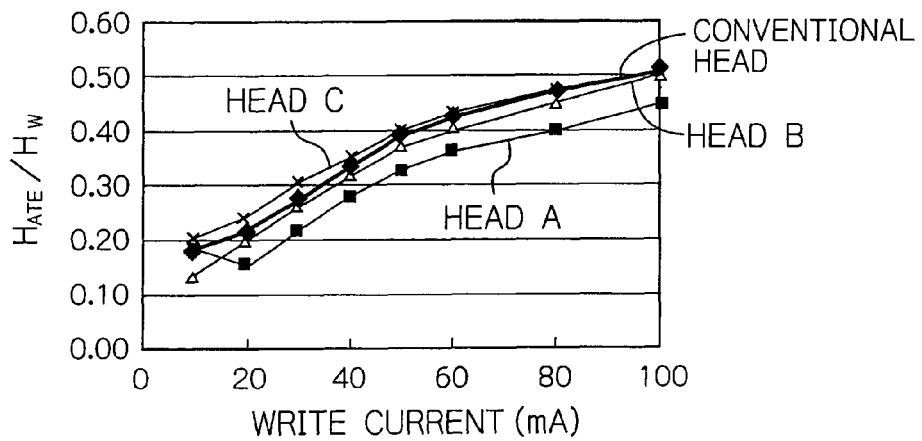

FIG. 9a shows a schematic diagram defining the neck depth ND and thickness $t_{LP}$ of the lower magnetic pole layer 3401. FIGS. 9b to 9d show graphs of the relationship between the write current, and the write field density $H_W$, ATE leakage field intensity $H_{ATE}$ and ratio $H_{ATE}/H_W$, in heads having various ND and $t_{LP}$ and a conventional head.

The configurations of magnetic poles of heads A to C and the conventional head shown in FIGS. 9b to 9d are shown in Table 1. The configurations of the heads are the same as the one shown in FIG. 7a except the values given in Table 1. The length $h_{IN}$ in Table 1, which is not shown in FIG. 9a, is the length between the end of the non-magnetic portion 35 on the ABS side and the end on the opposite side, as shown in FIG. 7a.

TABLE 1

|  | $t_{IN}$ (μm) | $h_{IN}$ (μm) | $T_{LP}$ (μm) | ND (μm) |
|---|---|---|---|---|
| Head A | 0.2 | 0.3 | 0.35 | 0.35 |
| Head B | 0.2 | 0.3 | 0.25 | 0.25 |
| Head C | 0.2 | 0.3 | 0.35 | 0.25 |
| Conventional head | 0 | 0 | 0.40 | 0.35 |

In Table 1, heads A and B are heads according to the present invention and each has a lower magnetic pole layer 3401 with a neck depth ND that is equal to the thickness $t_{LP}$. This means that the lower magnetic pole layer 3401 does not have shoulders and has a rectangular shape as shown in FIG. 9a. In head C, in contrast, the neck depth ND is 0.1 μm smaller than the thickness $t_{LP}$, which means that the lower magnetic pole layer 3401 has shoulders.

Referring to FIG. 9b, the write field intensity $H_W$ of head A is approximately the same as that of the conventional head. The write field intensity $H_W$ of head B in an area where write current is especially large is slightly lower than that of the conventional head. The write filed intensity $H_W$ of head C is higher than that of the conventional head.

Referring to FIG. 9c, the ATE leakage field intensities $H_{ATE}$ of heads A and B are lower than that of the conventional head. Reduction in ATE leakage field intensity is remarkable especially in head A. In contrast, the ATE leakage field intensity $H_{ATE}$ of head C is higher than that of the conventional head due to the existence of the shoulders of the lower magnetic pole layer.

Referring to FIG. 9d, as for the ratio of the ATE leakage field $H_{ATE}$ to the write field intensity $H_W$ obtained from the results given above, the ratio $H_{ATE}/H_W$ of head A is well smaller than the conventional head and the smallest. The ratio $H_{ATE}/H_W$ of head B is smaller than the conventional head, although the difference is rather modest. In head B, $t_{LP}$=ND=0.25 μm, which is smaller than the value of head A by 0.1 μm. It will be understood that ATE can be reduced reliably compared with the conventional head by ensuring the thickness greater than 0.25 μm. In other words, the thickness of the lower magnetic pole layer is preferably at least 0.25 μm in the magnetic pole configuration having a non-magnetic portion according to the present invention.

The ratio $H_{ATE}/H_W$ in head C is equal to that of the conventional head but, in the region where write current is large, is greater than that of the conventional head. In head C, the lower magnetic pole layer has shoulders as described above, the thickness of which is $t_{LP}$−ND=0.1 μm. Therefore, it can be understood that the ATE reduction effect shown by the head according to the present invention cannot be obtained by a head whose lower magnetic pole layer has shoulders like head C even if the head has a non-magnetic portion.

However, because it is very difficult to precisely control the etching endpoint in an etching process during the real manufacturing process of a thin-film magnetic head, minute shoulders can occur at the bottom portion of a formed lower magnetic pole layer even if it is intended to form the lower magnetic pole layer into a rectangular shape. Also, it is possible that a side surface does not form an angle perpendicular to the stacking layer planes or is somewhat uneven. However, experiments have shown that a head that has a magnetic pole configuration of the present invention but the lower magnetic pole layer has shoulders smaller than those of head C offers the effect of sufficiently reducing ATE. Thus, it will be apparent that a profile of the lower magnetic pole layer at the head end surface on the ABS side that have shoulders with a thickness of less than 0.1 μm or side surfaces with a slight slant or unevenness which can occur as a result of a manufacturing process as described, also falls within the category of "rectangular or approximately rectangular" shape of the present invention.

PRACTICAL EXAMPLE

The ATE reduction effect of thin-film magnetic heads according to the present invention will be described below by presenting practical examples of the present invention and conventional examples.

The heads of the present invention used as practical examples have the configuration shown in FIG. 7a and have a thickness $t_{IN}$ of 0.2 μm and a length $h_{IN}$ of 0.3 μm.

Figure 10:
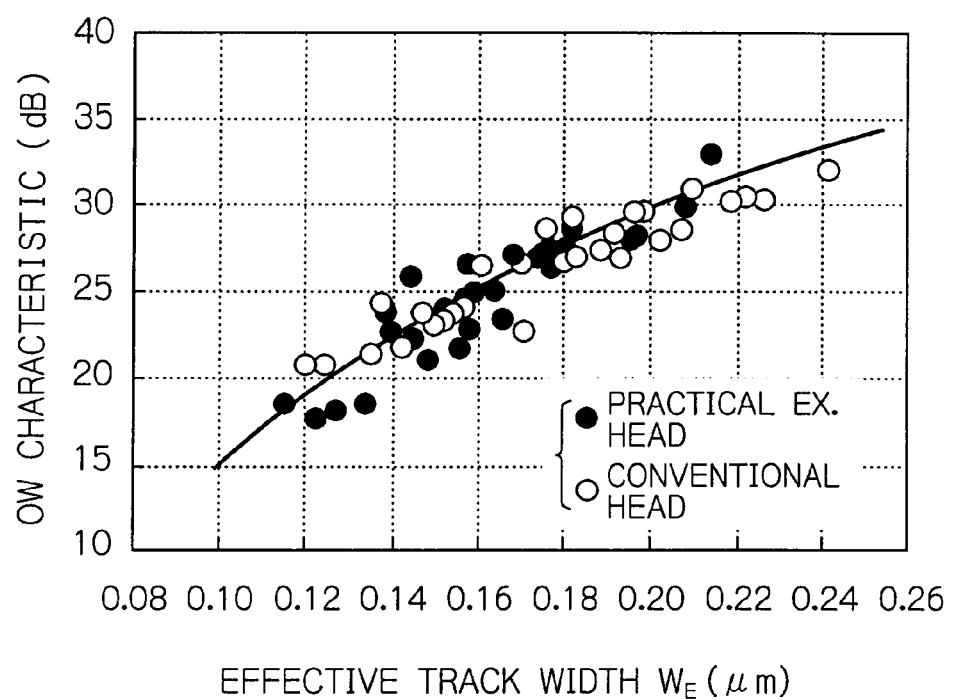
FIG. 10 shows a graph of the overwrite characteristics of the heads of the present invention and conventional heads having different effective track widths $W_E$.

FIG. 10 shows a graph of the overwrite (OW) characteristics of the heads of the present invention and conventional heads having different effective track widths $W_E$.

The effective track width $W_E$ of each head was determined by using the head to write tracks on a recording medium, actually scanning and reading the written tracks in the track width direction to obtain an output distribution along the track width direction, and obtaining the width of the distribution. The OW characteristic of each head is determined by using the head to write a signal of a given low frequency on a recording medium, overwriting a signal of a frequency 10 times higher than the low frequency, and expressing the ratio of the residue of the low-frequency signal first written relative to a read signal in decibels.

Referring to FIG. 10, the OW characteristics of the practical example heads (heads of the present invention) and the conventional heads increase as the effective track widths $W_E$ increase, and the data from these heads are distributed along approximately the same curve. From these results, it can be seen that the thin-film magnetic heads of the present invention have OW characteristics equivalent to those of conventional heads.

FIGS. 11a to 11d show a schematic diagram and graphs illustrating an ATE measuring method used for the practical example heads and conventional heads.

For the ATE measurement, first a head under measurement was used to write a predetermined number of tracks ($T_{-3}$ to $T_4$ shown in FIG. 11a, excluding $T_0$ at the center) on a magnetic disk approximately 2 inches in diameter. The track pitch was equal to the effective track width $W_E$ of the head and the write frequency $f_1$ was approximately 300 MHz. Then, output components near the frequency $f_1$ from the written tracks are measured along the track-width direction (along the radius of the disk) by using an MR effect element. As a result, an output voltage profile P1 as shown in FIG. 11b was obtained, in which the horizontal axis represents the position along the radius of the disk.

Figure 11A:
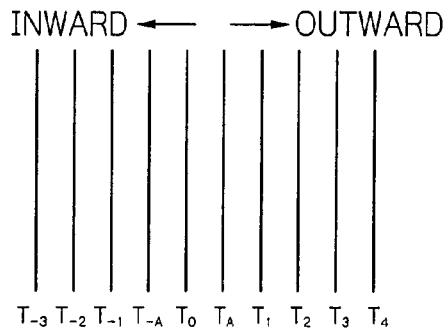
FIGS. 11a to 11d show a schematic diagram and graphs illustrating an ATE measuring method used for the practical example heads and conventional heads.
Figure 11B:
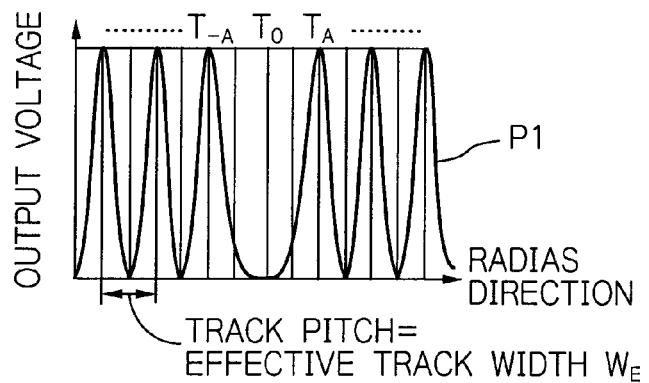
Figure 11C:
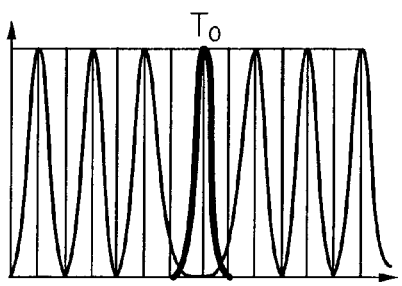
Figure 11D:
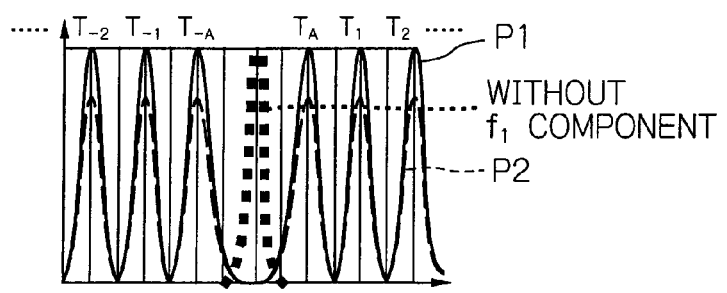

Then, about 10,000 write operations were performed in the position of track $T_0$ shown in FIG. 11a with a write frequency $f_2$ higher than the frequency $f_1$ (FIG. 11c). Then, output components near the frequency $f_1$ were measured again to obtain an output voltage profile P2 as shown in FIG. 11d. In the output voltage profile P2, the peaks at the track positions generally attenuate as compared with P1. The degree of attenuation was used to evaluate the degree of ATE of the head. In track position $T_0$, no output component of the frequency $f_1$ was found.

FIGS. 12a to 12d show graphs of the influence of ATE on the output voltage in heads of the present invention and conventional heads having different effective track widths $W_E$.

Figure 12A:
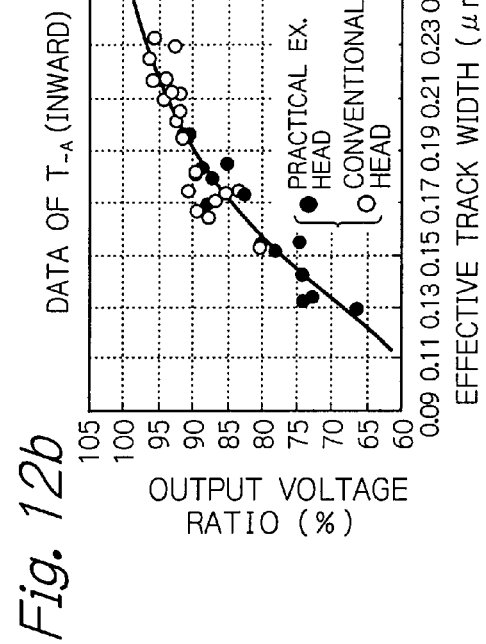
FIGS. 12a to 12d show graphs of the influence of ATE on the output voltage in heads of the present invention and conventional heads having different effective track widths $W_E$.
Figure 12B:
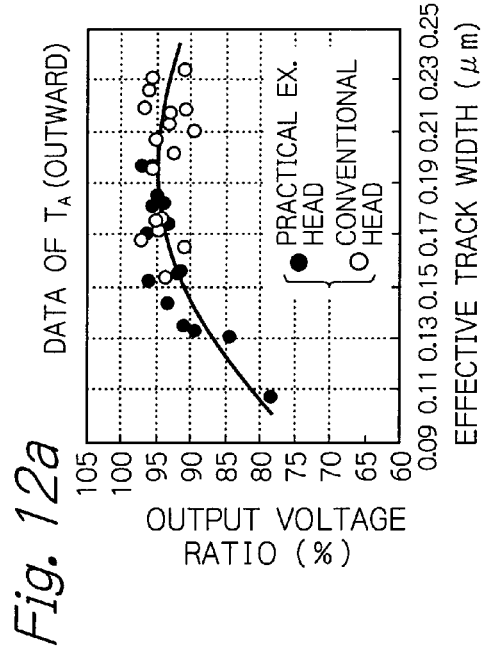
Figure 12C:
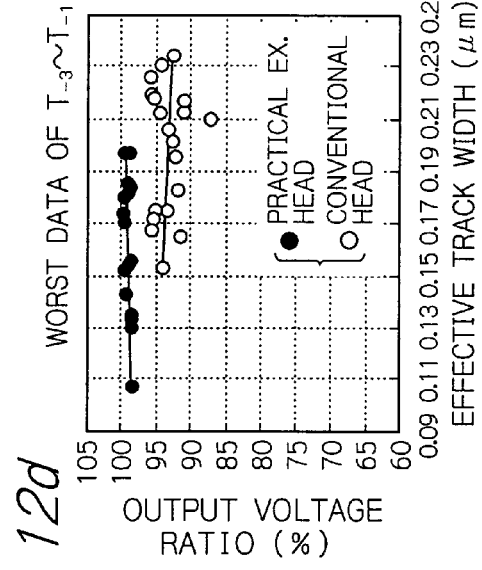
Figure 12D:
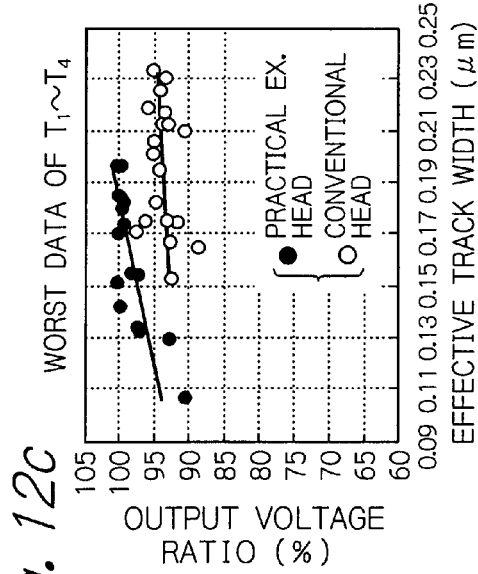

In the experiment for studying the influence of ATE on the output voltage the results of which are shown in FIGS. 12a to 12d, the method described with respect to FIGS. 11a to 11d was used to determine an output voltage profile as shown in FIG. 11d of each head having the different effective track widths $W_E$, and the degrees of attenuation of the peaks corresponding to the tracks in the profile were measured. FIG. 12a shows data from the outer adjacent track $T_A$, FIG. 12b shows data from the inner adjacent track $T_{-A}$, FIG. 12c shows data from the track that exhibited the highest attenuation among the outer tracks $T_1$ to $T_4$, and FIG. 12d shows data from the track that exhibited the highest attenuation among the inner tracks $T_{-3}$ to $T_{-1}$. The vertical axis of each graph represents, in percent figures, the ratio of the output voltage value in tracks after approximately 10,000 write operations in track $T_0$ relative to the initial voltage value. Smaller output voltage ratios mean higher degrees of influence of signal data erasure caused by ATE on the track.

Referring to FIGS. 12a and 12b, the heads of the present invention (practical example heads) and the conventional heads exhibit the same relationship between the effective track width $W_E$ and the output voltage ratio. On the other hand, referring to FIGS. 12c and 12d, the practical example heads have output voltage ratios higher than those of the conventional heads with the same effective track widths $W_E$. From these results, it can be understood that the heads of the present invention have an obvious ATE reduction effect in tracks farther from the tracks adjacent to a track in which write operations are performed.

FIGS. 13a to 13d show graphs of the influence of ATE on the S/N ratio in heads of the present invention and conventional heads having different effective track widths $W_E$.

Figure 13A:
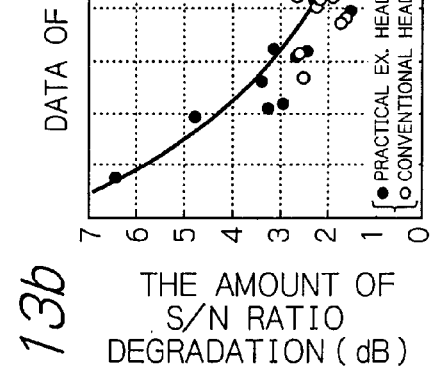
FIGS. 13a to 13d show graphs of the influence of ATE on the S/N ratio in heads of the present invention and conventional heads having different effective track widths $W_E$.
Figure 13B:
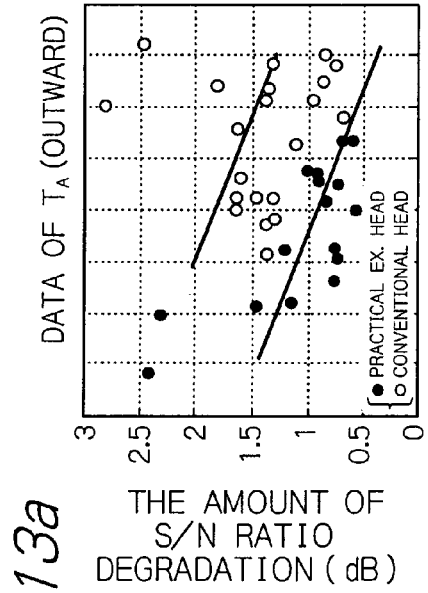
Figure 13C:
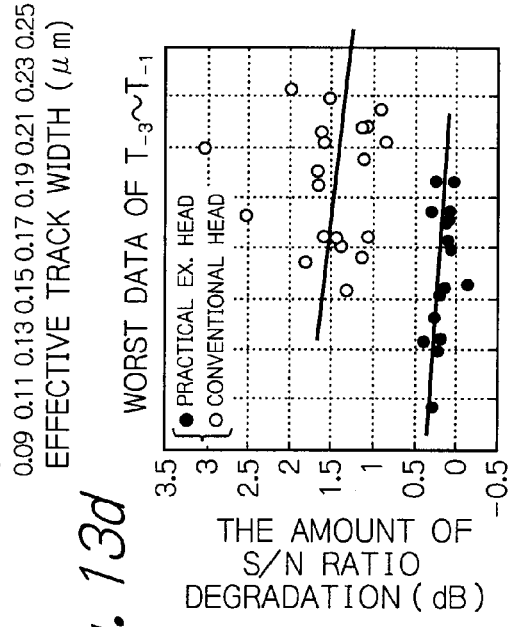
Figure 13D:
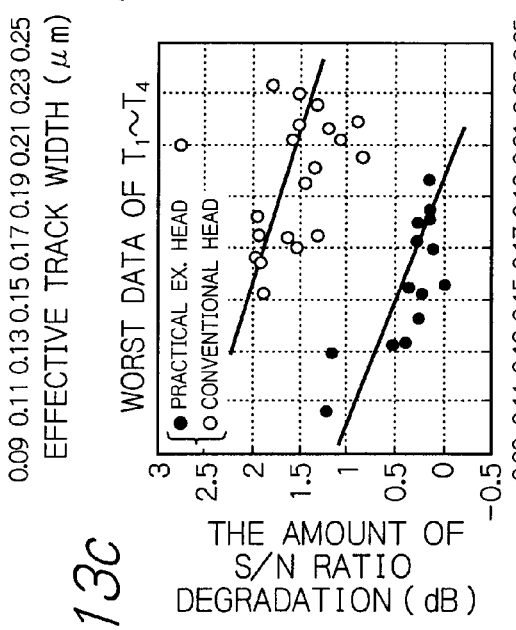

In the experiment for studying the influence of ATE on the S/N ratio the results of which are shown in FIGS. 13a to 13d, the method described with respect to FIGS. 11a to 11d was used to determine the output voltage profile as shown in FIG. 11d of each head having the different effective track widths $W_E$, and the ratio of the noise voltage to the output voltage in each track in the profile, namely the S/N ratio, was measured. FIG. 13a shows data from the outer adjacent track $T_A$, FIG. 13b shows data from the inner adjacent track $T_{-A}$, FIG. 13c shows data from the track that exhibited the highest attenuation among the outer tracks $T_1$ to $T_4$, and FIG. 13d shows data from the track that exhibited the highest attenuation among the inner tracks $T_{-3}$ to $T_{-1}$. The vertical axis of each graph represents the degree of S/N ratio degradation in the tracks due to 10,000 write operations in track $T_0$, namely the amount of S/N ratio degradation=(initial S/N ratio)−(S/N ratio after write operations in $T_0$). Greater amounts of S/N degradation mean higher degrees of influence of noise increase caused by ATE on the track.

Referring to FIG. 13b, the heads according to the present invention (practical example heads) and the conventional heads exhibit the same relationship between the effective track width $W_E$ and the amount of S/N ratio degradation. On the other hand, referring to FIGS. 12a, 12c, and 12d, the amounts of S/N degradation in the practical example heads are smaller than those in the conventional heads with the same effective track widths $W_E$. Thus, it will be understood that the heads according to the present invention provide an obvious ATE reduction effect also in the outer adjacent track, which was not obviously shown by the output voltage ratio.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head including an electromagnetic coil element comprising:
   a lower magnetic layer formed in an element formation surface of a substrate having an air bearing surface;
   an upper magnetic layer;
   a write gap layer, an end portion on the air bearing surface side of said write gap layer sandwiched between said lower magnetic layer and said upper magnetic layer; and
   a write coil layer passing through at least between said lower magnetic layer and said upper magnetic layer,
   said lower magnetic layer comprising:
      a lower yoke layer extending to a head end surface on the air bearing surface side;
      a non-magnetic portion formed on an upper surface of an end portion on the air bearing surface side of said lower yoke layer and extending to the head end surface on the air bearing surface side; and
      a lower magnetic pole layer formed on an upper surface of said non-magnetic portion and on an upper surface of an end portion on the air bearing surface side of said lower yoke layer, an upper surface of said lower magnetic pole layer being in contact with said write gap layer, and
      an end surface in the head end surface of said lower magnetic pole layer having a shape whose width along a track width direction is defined by a predetermined magnetic pole width.

2. The thin-film magnetic head as claimed in claim 1, wherein said shape whose width along the track-width direction is defined by said predetermined magnetic pole width is a rectangle or approximate rectangle having a width equal to said magnetic pole width.

3. The thin-film magnetic head as claimed in claim 1, wherein a thickness $t_{IN}$ of said non-magnetic portion and a length $h_{IN}$ between an end on the air bearing surface side and the opposite end of said non-magnetic portion satisfy the relation $h_{IN} < 2.5 \times t_{IN}$.

4. The thin-film magnetic head as claimed in claim 1, wherein a width along the track width direction of said non-magnetic portion is greater than a track pitch.

5. The thin-film magnetic head as claimed in claim 1, wherein a thickness $t_{LP}$ of said lower magnetic pole layer is greater than or equal to 0.25 micrometer.

6. The thin-film magnetic head as claimed in claim 1, wherein an upper surface of said non-magnetic portion is level with a top surface of an end portion on the air bearing surface side of said lower yoke layer.

7. The thin-film magnetic head as claimed in claim 1, wherein a lower surface of said non-magnetic portion is level with a lower surface of said lower magnetic pole layer.

8. The thin-film magnetic head as claimed in claim 1, wherein said upper magnetic layer comprises: an upper magnetic pole layer whose lower surface is in contact with said write gap layer; and an upper yoke layer whose end portion on the air bearing surface side is in contact with said upper magnetic pole layer.

9. A head gimbal assembly comprising:
   a thin-film magnetic head including an electromagnetic coil element comprising:
   a lower magnetic layer formed in an element formation surface of a substrate having an air bearing surface;
   an upper magnetic layer;
   a write gap layer, an end portion on the air bearing surface side of said write gap layer sandwiched between said lower magnetic layer and said upper magnetic layer; and
   a write coil layer passing through at least between said lower magnetic layer and said upper magnetic layer,
   said lower magnetic layer comprising:
      a lower yoke layer extending to a head end surface on the air bearing surface side;
      a non-magnetic portion formed on an upper surface of an end portion on the air bearing surface side of said lower yoke layer and extending to the head end surface on the air bearing surface side; and
      a lower magnetic pole layer formed on an upper surface of said non-magnetic portion and on an upper surface of an end portion on the air bearing surface side of said lower yoke layer, an upper surface of said lower magnetic pole layer being in contact with said write gap layer, and
   an end surface in the head end surface of said lower magnetic pole layer having a shape whose width along a track width direction is defined by a predetermined magnetic pole width; and
   a support mechanism for supporting said thin-film magnetic head.

10. The head gimbal assembly as claimed in claim 9, wherein said shape whose width along the track-width direction is defined by said predetermined magnetic pole width is a rectangle or approximate rectangle having a width equal to said magnetic pole width.

11. The head gimbal assembly as claimed in claim 9, wherein a thickness $t_{IN}$ of said non-magnetic portion and a length $h_{IN}$ between an end on the air bearing surface side and the opposite end of said non-magnetic portion satisfy the relation $h_{IN} < 2.5 \times t_{IN}$.

12. The head gimbal assembly as claimed in claim 9, wherein a width along the track width direction of said non-magnetic portion is greater than a track pitch.

13. The head gimbal assembly as claimed in claim 9, wherein a thickness $t_{LP}$ of said lower magnetic pole layer is greater than or equal to 0.25 micrometer.

14. The head gimbal assembly as claimed in claim 9, wherein an upper surface of said non-magnetic portion is level with a top surface of an end portion on the air bearing surface side of said lower yoke layer.

15. The head gimbal assembly as claimed in claim 9, wherein a lower surface of said non-magnetic portion is level with a lower surface of said lower magnetic pole layer.

16. The head gimbal assembly as claimed in claim 9, wherein said upper magnetic layer comprises: an upper magnetic pole layer whose lower surface is in contact with said write gap layer; and an upper yoke layer whose end portion on the air bearing surface side is in contact with said upper magnetic pole layer.

17. A magnetic disk drive apparatus comprising:
   at least one head gimbal assembly comprising:
   a thin-film magnetic head including an electromagnetic coil element comprising:
   a lower magnetic layer formed in an element formation surface of a substrate having an air bearing surface;
   an upper magnetic layer;
   a write gap layer, an end portion on the air bearing surface side of said write gap layer sandwiched between said lower magnetic layer and said upper magnetic layer; and
   a write coil layer passing through at least between said lower magnetic layer and said upper magnetic layer,
   said lower magnetic layer comprising:

a lower yoke layer extending to a head end surface on the air bearing surface side;

a non-magnetic portion formed on an upper surface of an end portion on the air bearing surface side of said lower yoke layer and extending to the head end surface on the air bearing surface side; and a lower magnetic pole layer formed on an upper surface of said non-magnetic portion and on an upper surface of an end portion on the air bearing surface side of said lower yoke layer, an upper surface of said lower magnetic pole layer being in contact with said write gap layer, and an end surface in the head end surface of said lower magnetic pole layer having a shape whose width along a track width direction is defined by a predetermined magnetic pole width; and a support mechanism for supporting said thin-film magnetic head;

at least one magnetic recording medium; and a recording/reproducing means for controlling read and write operations of said thin-film magnetic head to said at least one magnetic recording medium.

18. The magnetic disk drive apparatus as claimed in claim 17, wherein said shape whose width along the track-width direction is defined by said predetermined magnetic pole width is a rectangle or approximate rectangle having a width equal to said magnetic pole width.

19. The magnetic disk drive apparatus as claimed in claim 17, wherein a thickness $t_{IN}$ of said non-magnetic portion and a length $h_{IN}$ between an end on the air bearing surface side and the opposite end of said non-magnetic portion satisfy the relation $h_{IN} < 2.5 \times t_{IN}$.

20. The magnetic disk drive apparatus as claimed in claim 17, wherein a width along the track width direction of said non-magnetic portion is greater than a track pitch.

21. The magnetic disk drive apparatus as claimed in claim 17, wherein a thickness $t_{LP}$ of said lower magnetic pole layer is greater than or equal to 0.25 micrometer.

22. The magnetic disk drive apparatus as claimed in claim 17, wherein an upper surface of said non-magnetic portion is level with a top surface of an end portion on the air bearing surface side of said lower yoke layer.

23. The magnetic disk drive apparatus as claimed in claim 17, wherein a lower surface of said non-magnetic portion is level with a lower surface of said lower magnetic pole layer.

24. The magnetic disk drive apparatus as claimed in claim 17, wherein said upper magnetic layer comprises: an upper magnetic pole layer whose lower surface is in contact with said write gap layer; and an upper yoke layer whose end portion on the air bearing surface side is in contact with said upper magnetic pole layer.

* * * * *